US007076102B2

(12) United States Patent
Lin et al.

(10) Patent No.: US 7,076,102 B2
(45) Date of Patent: Jul. 11, 2006

(54) VIDEO MONITORING SYSTEM EMPLOYING HIERARCHICAL HIDDEN MARKOV MODEL (HMM) EVENT LEARNING AND CLASSIFICATION

(75) Inventors: Yun-Ting Lin, Ossining, NY (US); Srinivas Gutta, Yorktown Heights, NY (US); Tomas Brodsky, Croton on Hudson, NY (US); Vasanth Philomin, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 712 days.

(21) Appl. No.: 10/183,673

(22) Filed: Jun. 27, 2002

(65) Prior Publication Data

US 2003/0058340 A1    Mar. 27, 2003

Related U.S. Application Data

(60) Provisional application No. 60/325,399, filed on Sep. 27, 2001.

(51) Int. Cl.
*G06K 9/68* (2006.01)

(52) U.S. Cl. ......................... 382/218; 382/224; 703/17; 704/256.1

(58) Field of Classification Search ................ 382/181, 382/224, 218, 228; 704/240, 232, 231, 254, 704/255, 256, 256.7, 270, 256.1; 703/17
See application file for complete search history.

(56) References Cited

U.S. PATENT DOCUMENTS

| | | | |
|---|---|---|---|
| 5,381,513 A | | 1/1995 | Tsuboka ..................... 395/2.41 |
| 6,092,045 A | * | 7/2000 | Stubley et al. ............... 704/254 |
| 6,591,146 B1 | * | 7/2003 | Pavlovic et al. .............. 700/29 |
| 6,678,413 B1 | * | 1/2004 | Liang et al. ................. 382/181 |
| 6,704,454 B1 | * | 3/2004 | Spence et al. .............. 382/240 |

OTHER PUBLICATIONS

Bourbakis et al., "A Synergistic Model for Interpreting Human Activities and Events From Video: A Case Study," (2000).
Bui et al, "Tracking and Surveillance in Wide-Area Spatial Environments Using the Abstract Hidden Markov Model," Curtin University of Technology, (2001).
Jansen, Bart, "Visual Event Recognition," Vrije Universiteit Brussel, (2000-2001).
Karaulova et al., "A Hierarchical Model of Dynamics for Tracking People with a Single Video Camera," (2000).

(Continued)

*Primary Examiner*—Sheela Chawan

(57) ABSTRACT

A method and apparatus are disclosed for automatically learning and identifying events in image data using hierarchical HMMs to define and detect one or more events. The hierarchical HMMs include multiple paths that encompass variations of the same event. Hierarchical HMMs provide a framework for defining events that may be exhibited in various ways. Each event is modeled in the hierarchical HMM with a set of sequential states that describe the paths in a high-dimensional feature space. These models can then be used to analyze video sequences to segment and recognize each individual event to be recognized. The hierarchical HMM is generated during a training phase, by processing a number of images of the event of interest in various ways, typically observed from multiple viewpoints.

25 Claims, 6 Drawing Sheets

OTHER PUBLICATIONS

Oliver et al., "A Bayesian Computer Vision System for Modeling Human Interactions," IEEE Transaction on Pattern Analysis and Machine Intelligence, V. 22, No. 8 (2000).

Wada et al., "Multiobject Behavior Recognition by Event Dirven Selective Attention Method," IEEE Transaction on Pattern Analysis and Machine Intelligence, V. 22, No. 8 (2000).

* cited by examiner

VIDEO MONITORING SYSTEM EMPLOYING HIERARCHICAL HIDDEN MARKOV MODEL (HMM) EVENT LEARNING AND CLASSIFICATION

CROSS REFERENCE TO RELATED APPLICATIONS

This application claims the benefit of U.S. Provisional Application No. 60/325,399, filed Sep. 27, 2001.

FIELD OF THE INVENTION

The present invention relates to video surveillance systems, and more particularly, to video monitoring and surveillance systems with improved event modeling and detection using hierarchical Hidden Markov Models (HMMs).

BACKGROUND OF THE INVENTION

Due to increasing labor costs, as well as an inadequate number of qualified employee candidates, many retail businesses and other establishments must often operate with an insufficient number of employees. Thus, when there are not enough employees to perform every desired function, the management must prioritize responsibilities to ensure that the most important functions are satisfied, or find an alternate way to perform the function. For example, many retail establishments utilize automated theft detection systems to replace or supplement a security staff.

In addition, many businesses do not have enough employees to adequately monitor an entire store or other location, for example, for security purposes or to determine when a patron may require assistance. Thus, many businesses and other establishments position cameras at various locations to monitor the activities of patrons and employees. While the images generated by the cameras typically allow the various locations to be monitored by one person positioned at a central location, such a system nonetheless requires human monitoring to detect events of interest.

Thus, a number of computer vision monitoring and surveillance techniques have been proposed or suggested to automatically identify one or more predefined events in a sequence of images. Such events could include, for example, unauthorized personnel in an area, a queue that is too long, a door that is left open, or a patron requiring assistance.

Typically, computer vision systems accept an input image and compare the input image with a number of states. The image is assigned to a state when the input image sufficiently matches the state. Generally, matching is performed by comparing input image information with state image information from each of the states. The states are typically modeled using a number of known techniques, such as Hidden Markov Models, histograms, or clustering.

Complex events are defined recursively in terms of simpler events, using an event description language. A parsing module processes the stream of detected simpler events and recognizes complex events. Object trajectories have been analyzed to identify various dynamic events, such as a person entering or exiting a room or a person depositing an object. Simple motions, such as a person walking or running, can be learned and recognized from spatio-temporal motion templates. For example, probabilistic techniques, such as Hidden Markov models (HMMs) and Bayesian networks, have been used extensively to recognize complex motion patterns and to learn and recognize human activities.

While such event classification techniques perform effectively for some complex events, it has been observed that conventional event classification techniques do not perform well when the same event may be exhibited in various ways, especially in the presence of viewpoint changes or broad ranges of possible motion, such as when a person is falling. In addition, conventional event classification techniques do not consider the context of an event, to distinguish, for example, a person falling down to the floor as opposed to a person lying down into bed. A need therefore exists for an improved computer based method and apparatus for automatically identifying complex events in an image sequence.

SUMMARY OF THE INVENTION

Generally, a method and apparatus are disclosed for automatically learning and identifying events in image data. According to one aspect of the invention, hierarchical HMMs are employed to define one or more events. The hierarchical HMMs include multiple paths that encompass variations of the same event. Generally, events have a complex time-varying behavior. Hierarchical HMMs provide a framework for defining events that may be exhibited in various ways. For example, the manner in which a person falls down to the floor can vary in terms of speed, direction, or the intermediate states of the body posture (or a combination of the foregoing).

Each event is modeled in the hierarchical HMM with a set of sequential states that describe the paths in a high-dimensional feature space. These models can then be used to analyze video sequences to segment and recognize each individual event to be recognized. The hierarchical HMM is generated during a training phase, by processing a number of images of the event of interest in various ways, typically observed from multiple viewpoints. The representative paths in the hierarchical HMM and their corresponding intermediate states are identified. Clustering techniques are applied in the feature space to determine when to split or merge hidden states in the HMM graph. The exemplary training algorithm starts with two hidden states (start and end) and iteratively trains the HMM parameters to add additional hidden states, until an overall likelihood criterion is satisfied. In addition, a number of techniques can optionally be employed to prevent the HMM model from having too many overlapping states.

Additional recognition accuracy can be obtained by exploiting information that may be known about the context of an event. In certain applications, such as elderly monitoring, a subtle distinction between similar events can be important (e.g., a person falling down to the floor versus lying down on a bed) and context information, such as time or location information, can be used to improve event recognition accuracy.

A more complete understanding of the present invention, as well as further features and advantages of the present invention, will be obtained by reference to the following detailed description and drawings.

DETAILED DESCRIPTION

Figure 1:
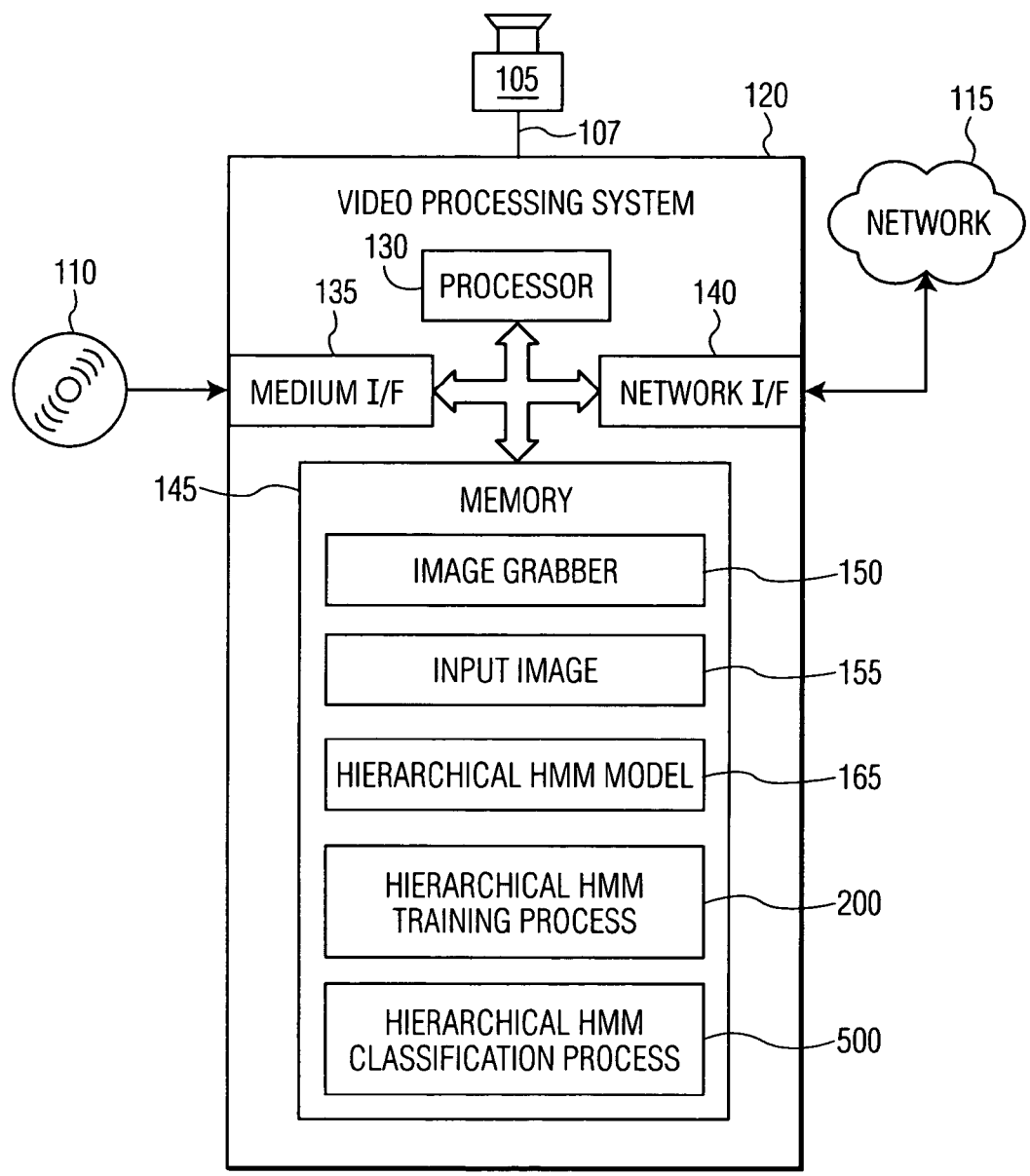
FIG. 1 illustrates an exemplary video monitoring system in accordance with a preferred embodiment of the invention.

The present invention provides a video processing system 120 for automatically learning and identifying events from a sufficient amount of image data. The image data from training sequences will be segmented to include only the person (or object) engaging in the event of interest. Since the same type of event may be exhibited in various ways, either by different people or by the same person at different times or in different contexts, an event mode according to the present invention includes multiple paths that encompass variations of the same event. For example, the manner in which a person falls down to the floor can vary in terms of speed, direction, or the intermediate states of the body posture (or a combination of the foregoing). The present invention selects the most appropriate camera view in a multi-camera setup, and also uses viewpoint invariant or three-dimensional information as features associated with each state for event representation and recognition.

For certain applications, such as elderly monitoring, where a subtle distinction between similar events is important (e.g., a person falling down to the floor versus lying down on a bed), context information or higher-level reasoning (e.g., the location of the bed) will be used. Generally, events have a complex time-varying behavior. In order to model all of these variations, the present invention proposes a framework that is based on the Hidden Markov Model (HMM), which provides a powerful probabilistic framework for learning and recognizing signals that exhibit complex time-varying behavior. Each event is modeled with a set of sequential states that describe the paths in a high-dimensional feature space. These models can then be used to analyze video sequences to segment and recognize each individual event to be recognized.

According to one aspect of the present invention, a hierarchical HMM is proposed, which encompasses all possible paths with their corresponding intermediate states that constitute an event of interest. In the example of a person falling down, all fall-down events share two common states: a starting state when a person is in a normal standing posture, and an ending state when the person has fallen down. Fall-down events take multiple paths, however, between the starting and ending states.

The video processing system 120 is presented with a number of example sequences during a training phase, for example, from a segmented video of a person falling down in various ways observed from multiple viewpoints, such as from different cameras. Thereafter, as discussed further below in conjunction with FIG. 2, the video processing system 120 identifies the representative paths and their corresponding intermediate states. Clustering techniques are applied in the feature space to determine splitting and merging of hidden states in the Markov graph.

In event learning, it is important to have an appropriate number of hidden states in order to characterize each particular event. The proposed algorithm starts with two hidden states (start and end). It then iteratively trains the HMM parameters using, for example, Baum-Welch cycles, and more hidden states can be automatically added one by one, until an overall likelihood criterion is met.

According to another aspect of the invention, a number of techniques can be employed to prevent the model from having too many overlapping states. For example, Jeffrey's divergence is optionally used to measure the separation between two consecutive states. In addition, the present invention selects features that can capture the spatio-temporal characteristics of an event in any time instant. Features (or observation vectors) associated with each state can take any of (or a combination of) the following forms: visual appearance (e.g., image data, silhouette), motion description (e.g., the level of motion in different parts of the human body), body posture (e.g., standing, sitting, or lying), and view-invariant features.

Referring now to FIG. 1, a video processing system 120 is shown that generates and maintains a background model in accordance with preferred embodiments of the present invention for background-foreground segmentation. Video processing system 120 is shown interoperating with one or more cameras, such as camera 105, through video feed 107, a Digital Versatile Disk (DVD) 110 and a network 115. Video processing system 120 comprises a processor 130, a medium interface 135, a network interface 140, and a memory 145. Memory 145 comprises image grabber 150, an input image 155, a hierarchical HMM model 165, a hierarchical HMM training process 200, discussed below in conjunction with FIG. 2, and a hierarchical HMM classification process 500, discussed below in conjunction with FIG. 5.

As is known in the art, the methods and apparatus discussed herein may be distributed as an article of manufacture that itself comprises a computer-readable medium having computer-readable code means embodied thereon. The computer-readable program code means is operable, in conjunction with a computer system such as video processing system 120, to carry out all or some of the steps to perform the methods or create the apparatuses discussed herein. The computer-readable medium may be a recordable medium (e.g., floppy disks, hard drives, compact disks such as DVD 110 accessed through medium interface 135, or memory cards) or may be a transmission medium (e.g., a network 115 comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 110.

Memory 145 will configure the processor 130 to implement the methods, steps, and functions disclosed herein. The memory 145 could be distributed or local and the processor 130 could be distributed or singular. The memory 145 could be implemented as an electrical, magnetic or optical memory, or any combination of these or other types of storage devices. The term "memory" should be construed broadly enough to encompass any information able to be read from or written to an address in the addressable space accessed by processor 130. With this definition, information on a network, such as network 115 accessed through network interface 140, is still within memory 145 of the video processing system 120 because the processor 130 can retrieve the information from the network. It should also be noted that all or portions of video processing system 120 may be made into an integrated circuit or other similar device, such as a programmable logic circuit.

Now that a system has been discussed, probability models will be discussed that can provide global and local pixel dependencies and incremental training.

Training Phase:

During a training phase, a number of input image sequences that correspond to the same type of events (e.g., falling) and capture as many variations as possible of such event (including images of the event from multiple view points) are applied to the video processing system 120. The video processing system 120 then extracts the following attributes from the spatial (image cues) and temporal (corresponding frame) information:

1. the object (such as the person who is falling) segmented from the video frame, or object parts (such as the person's head, torso or legs); and
2. height, size and shape information characterizing the segmented blob that corresponds to the segmented object.

It is noted that each of the extracted attributes are a function of time, t. These attributes jointly define the feature vector associated with each state in the HMM.

Figure 2:
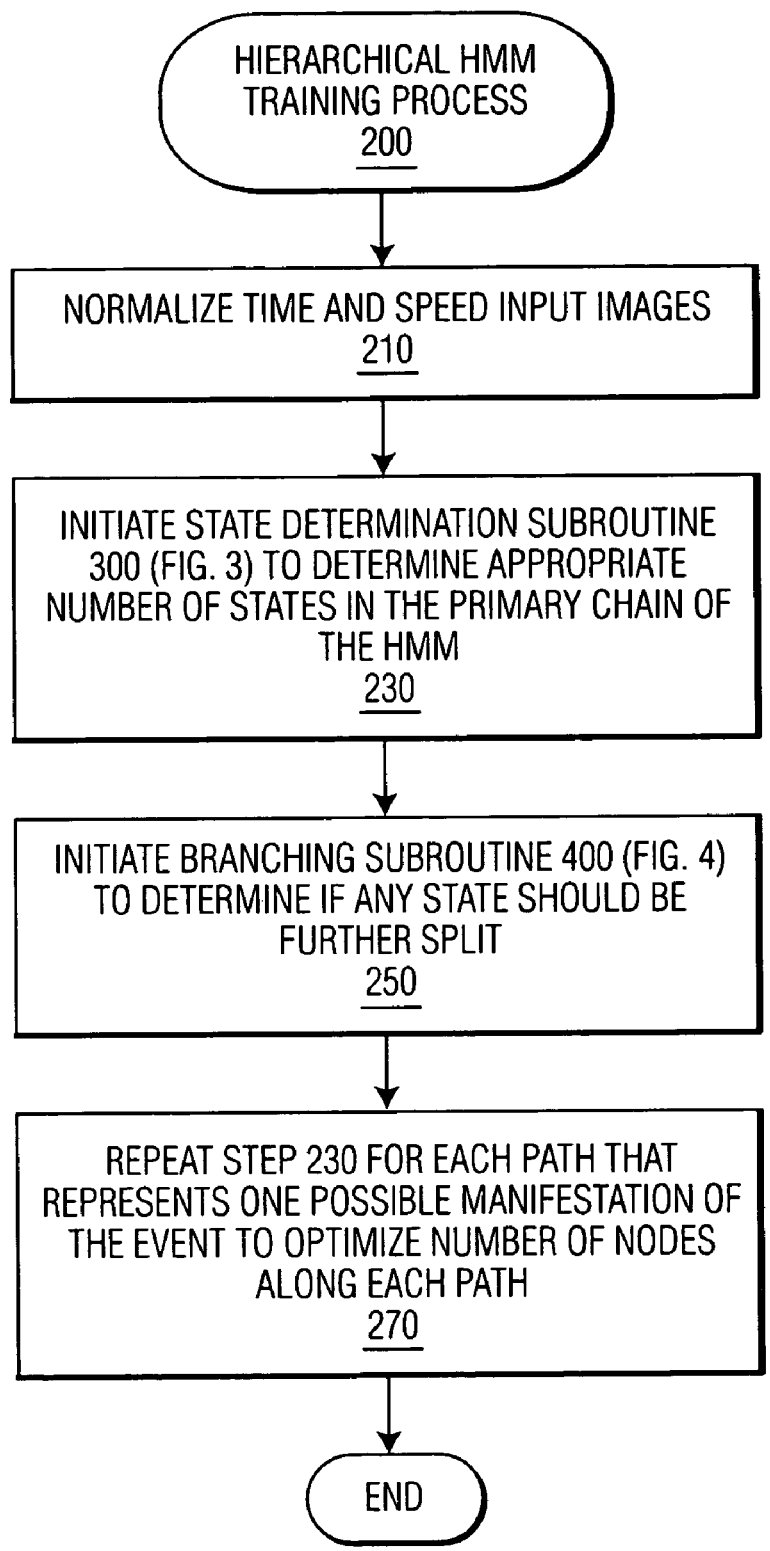
FIG. 2 is a flow chart describing an exemplary implementation of the hierarchical HMM training process of FIG. 1 incorporating features of the present invention.

FIG. 2 is a flow chart describing an exemplary hierarchical HMM training process 200. As shown in FIG. 2, the hierarchical HMM training process 200 initially, normalizes the time and speed of the input images during step 210. In this manner, the image sequences are aligned. More specifically, in the exemplary embodiment, the start and end of each event, such as a person falling, is manually marked. Since each falling event from start to end may take a different amount of time, the time or speed (or both) are normalized during step 210. For instance, if the average time duration for all falling events take X seconds, all falling examples in the training set are "time-warped" to be normalized to take X seconds. In the exemplary embodiment time-warping is not performed using a frame rate conversion or image interpolation, but rather, by simply remarking the time index. In other words, the time index of each image sequence is adjusted, as opposed to adjusting the number of frames.

Once the time or speed (or both) of the input images are normalized during step 210, an appropriate number of states in the primary chain of the HMM is determined during step 230. The determination of an appropriate number of states in the primary chain of the HMM is performed by a state determination subroutine 300, discussed further below in conjunction with FIG. 3. Generally, the state determination subroutine 300 minimizes an objective cost function to determine an optimum number of states.

Once the primary chain is determined by the state determination subroutine 300, the hierarchical HMM training process 200 determines during step 250 if each state should be further split, thereby resulting in branching of the HMM. The determination of whether each state should be further split is performed by a branching subroutine 400, discussed further below in conjunction with FIG. 4.

Once the branching subroutine 400 has formed the branching structure(s), Step 230 is repeated during step 270 for each path that represents one possible manifestation of the event, so that the number of nodes along that path can again be optimized according to the objective function. Step 270 serves to remove redundant representations in the model, by comparing the objective cost function of each path. In addition, the state parameters are again updated in the process. Once all the paths created by the branching process have been optimized during step 270, the hierarchical HMM model is complete and the execution of the hierarchical HMM training process 200 terminates.

Figure 3:
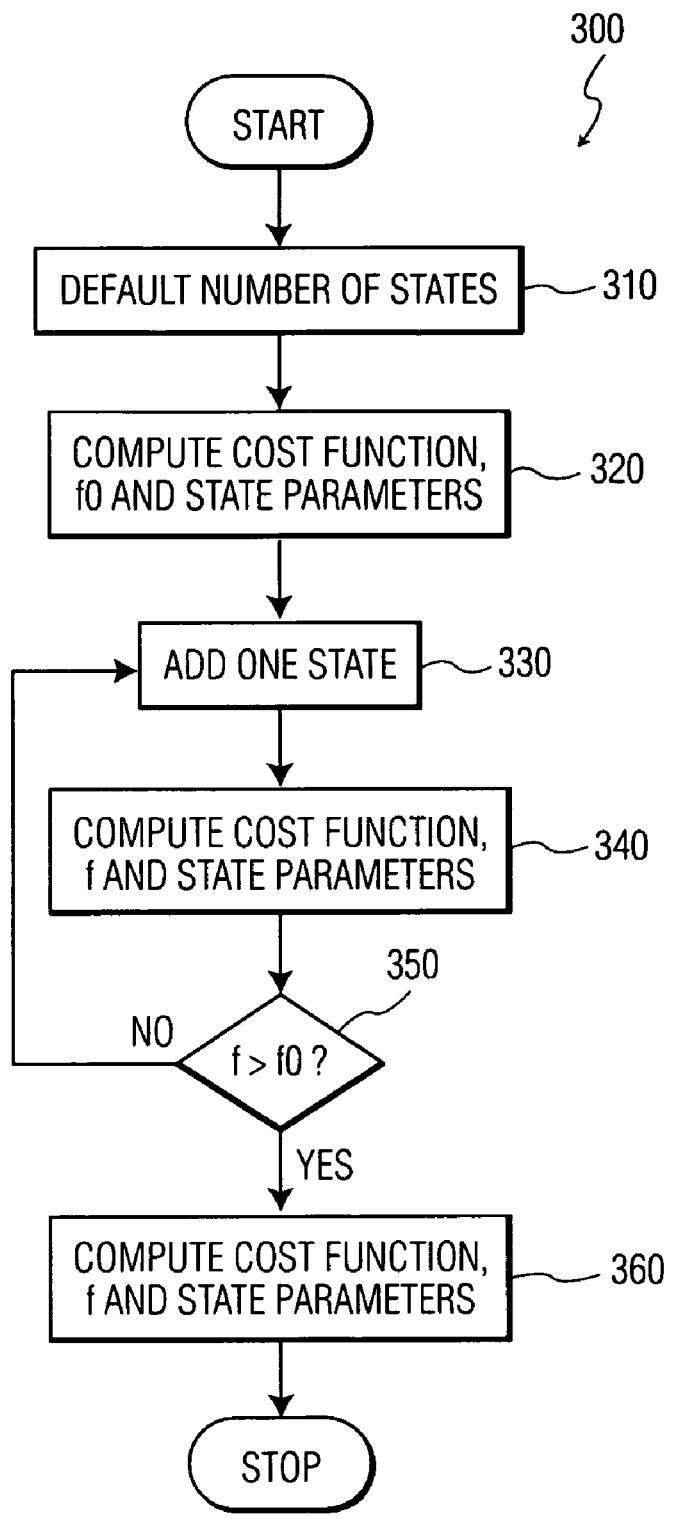
FIG. 3 is a flow chart describing an exemplary implementation of the state determination subroutine of FIG. 2.

FIG. 3 is a flow chart describing an exemplary implementation of the state determination subroutine 300 that is initially performed during step 230 of the hierarchical HMM training process 200 for the primary path, and is performed again during step 270 for each of the additional paths created by the branching subroutine 400. The state determination subroutine 300 is initiated after normalization with time by the hierarchical HMM training process 200. The goal of the state determination subroutine 300 is to position state boundaries where the divergence between adjacent states is a maximum. It is noted that while the hierarchical HMM training process 200 adds states to the model horizontally, the state determination subroutine 300 serves to add states to the model vertically.

The state determination subroutine 300 starts from a default number of states in the HMM chain during step 310. An objective cost function is computed during step 320 that depends on (1) the overall likelihood measure of the entire chain, (2) the divergence measure between adjacent states, and (3) the penalty term for each state added to the chain. The objective cost function will be optimized by the state determination subroutine 300 to determine the optimum number of states. Among the three terms in the objective cost function, the first one makes sure the modeling is adequate and favors having more states. The first term models the variation of each state among all examples (the likelihood will be higher for similar examples). The second and third terms keep the number of states tractable. If the second term indicates similar states, then the two states are merged. The objective cost function computed during step 320 may be expressed as follows:

$$C(S) = \alpha \left( \sum_{i=1}^{N} P(v \mid S_i) \right) + \beta \left( \sum_{i=1}^{N-1} D(S_i, S_{i+1}) \right) - \gamma(N)$$

where $S_i$ is the i-th state in the chain, N is the total number of states, v is the observation, $P(v|S_i)$ and $D(S_i, S_j)$ are defined as in Colmenarez A. J., Gutta S. and Huang T. S. Modeling the Dynamics of Facial Expressions. Submitted to Workshop in Cues and Communication, Computer Vision and Pattern Recognition, Hawaii, USA (2001), incorporated by reference herein, and $\alpha, \beta$ and $\gamma$ are pre-defined constants.

The final number of states is determined in the optimization process of the objective function during steps 330 through 350. One state is added to the model during step 330. The objective cost function, f, is again computed during step 340 for the HMM model having a new number of states. A test is performed during step 350 to determine if the objective cost function, f, for the new number of states exceeds the objective cost function computed during step 320. If it is determined during step 350 that the objective cost function, f, for the new number of states does not exceed the objective cost function computed during step 320 then program control returns to step 330 to add an additional state.

If, however, it is determined during step 350 that the objective cost function, f, for the new number of states does exceed the objective cost function computed during step 320 then the final number of states has been optimized and program control proceeds to step 360. Where the objective cost function is again computed for the final number of states, together with the state parameters (e.g., height, size and shape of segmented blob, and raw image data). The output of the state determination subroutine 300 is the number of states and the allocation of frames to particular states. Generally, consecutive frames are assigned to a state until a state boundary occurs. There can be a variable number of frames for each state.

Figure 4:
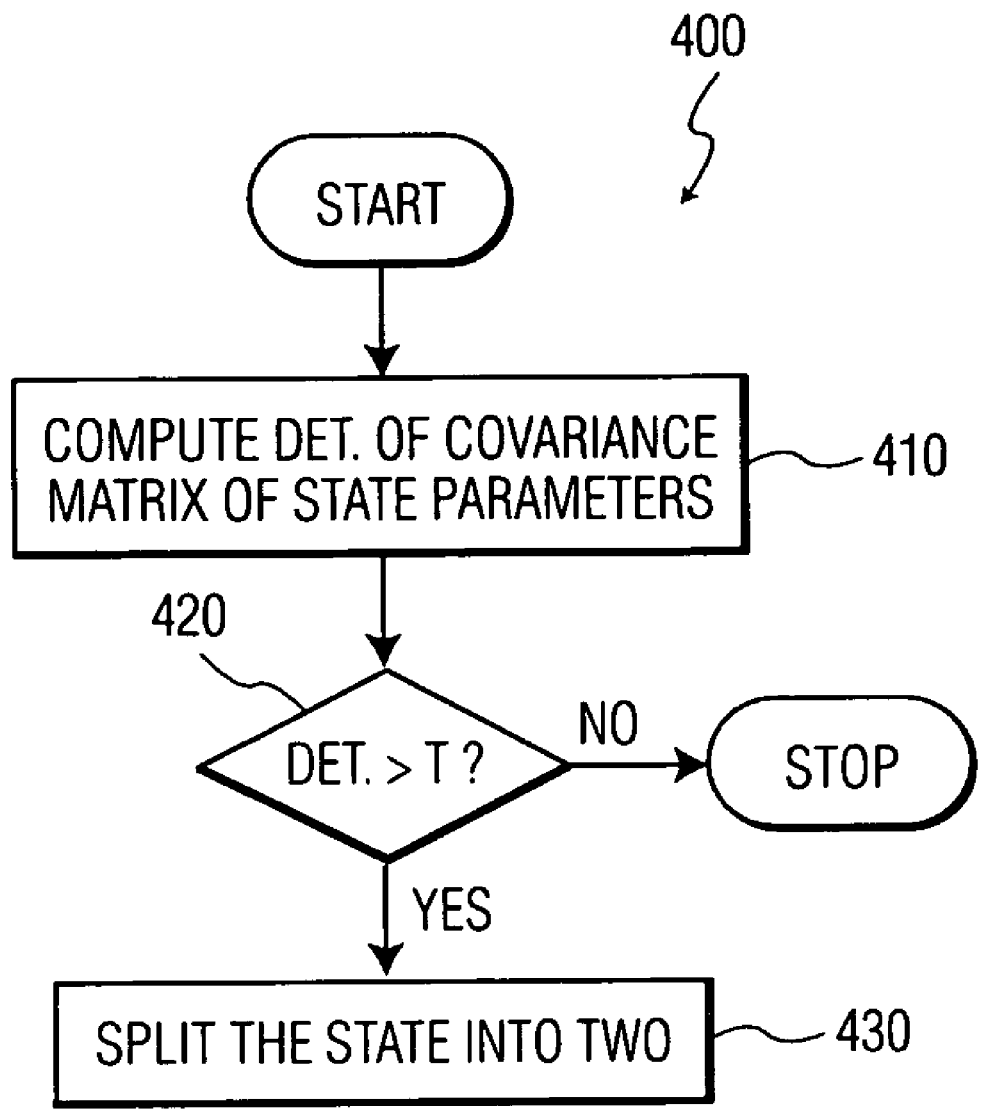
FIG. 4 is a flow chart describing an exemplary implementation of the branching subroutine 400 of FIG. 2.

FIG. 4 is a flow chart describing an exemplary implementation of the branching subroutine 400 that is performed during step 250 of the hierarchical HMM training process 200. For each state in the chain, if the state model is not representative enough (e.g., the determinant of the data covariance matrix is larger than a threshold), the state will be split into two and a branch will be created from this state (preserving all links). The splitting process continues until the data covariance matrix meets the predefined threshold criteria at all states.

As shown in FIG. 4, the branching subroutine 400 initially computes the determinant of the covariance matrix of the state parameters during step 410. A test is then performed during step 420 to determine if the variance exceeds a predefined threshold, T, for the particular state. If it is determined during step 420 that the variance exceeds a predefined threshold, T, for the particular state, then the state is split into two states during step 430 (preserving the links from the previous state and to the next state). Thereafter, program control returns to step 410 to process the two new split states.

Once it is determined during step 420 that the variance does not exceed a predefined threshold, T, for the particular state, then program control terminates. It is again noted that the branching subroutine 400 is performed for each state.

Retrieval Phase:

According to another aspect of the invention, the video processing system 120 identifies one or more events during the retrieval phase that are defined by the hierarchical HMM model. The video processing system 120 applies the video sequence to the hierarchical HMM model and assumes that every frame can potentially start an event.

Figure 5:
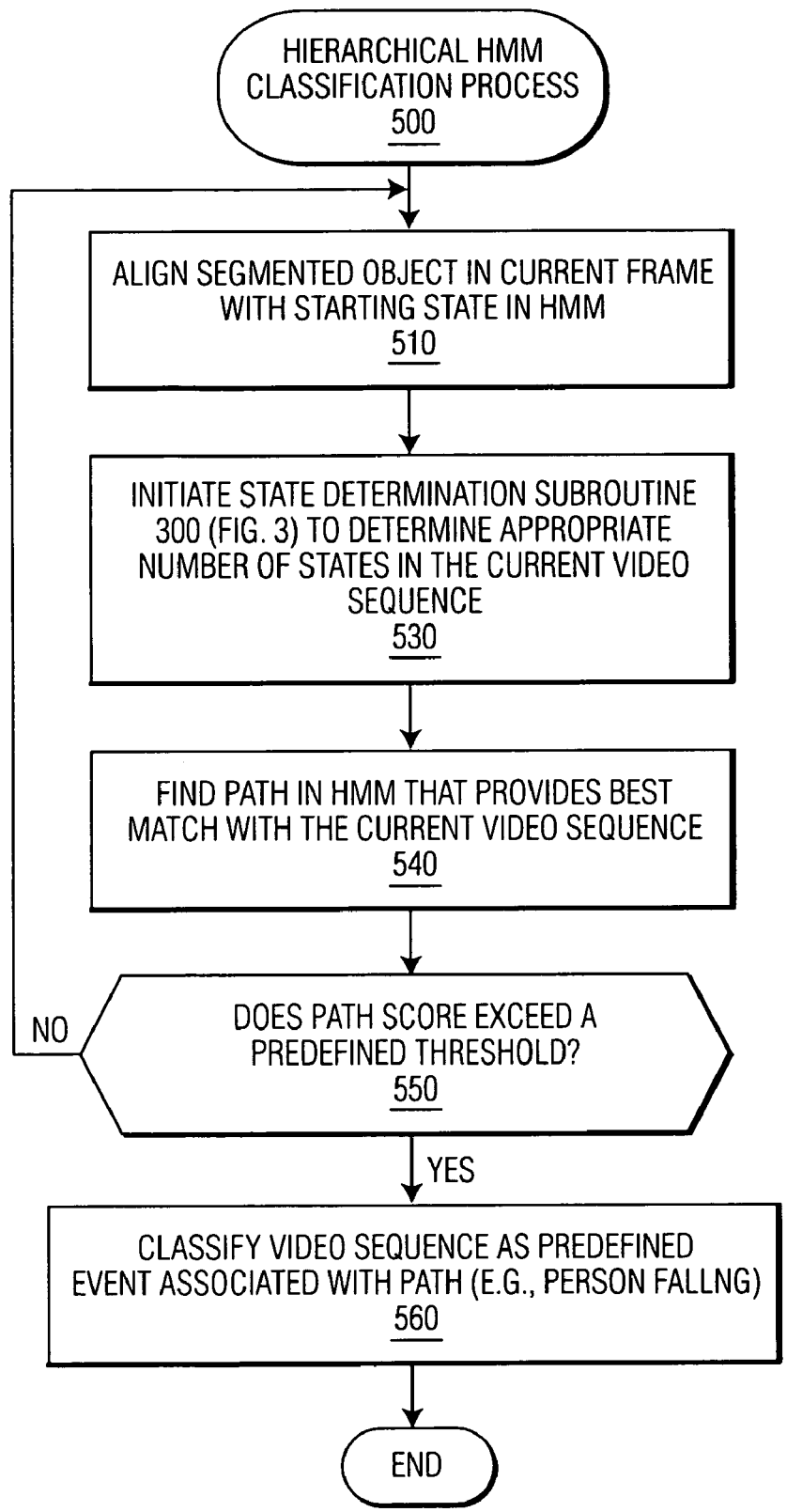
FIG. 5 is a flow chart describing an exemplary implementation of the hierarchical HMM classification process 500 of FIG. 1 incorporating features of the present invention.

During the retrieval phase, the video processing system 120 employs the hierarchical HMM classification process 500 to match the segmented object in the video with the best path in the event's hierarchical HMM model built by the hierarchical HMM training process 200. FIG. 5 is a flow chart describing an exemplary hierarchical HMM classification process 500. Generally, the hierarchical HMM classification process 500 finds the best match of a video segment with the hierarchical HMM built from training data. The hierarchical HMM classification process 500 marks the start and the end of the event, and determines the likelihood for a particular video segment to be classified as the target event, say falling.

As shown in FIG. 5, the hierarchical HMM classification process 500 initially aligns the segmented object in the current frame with the starting state in the HMM during step 510, and then applies the same unsupervised scheme during step 530 as described above for Step 230 of the hierarchical HMM training process 200 to determine the number of states in the currently observed video clip and the state boundaries.

Thereafter, the hierarchical HMM classification process 500 finds the path in the HMM that provides the best match with the current video sequence during step 540. A test is performed during step 550 to determine if the path score exceeds a predefined threshold. If it is determined during step 550 that the path score does exceed a predefined threshold, then the video sequence is classified as a falling event during step 560 and the corresponding path can be extracted. If, however, the score does not exceed a predefined threshold during step 550, then the hierarchical HMM classification process 500 returns to step 510 to continue evaluating additional video sequences, in the manner described above.

Figure 6:
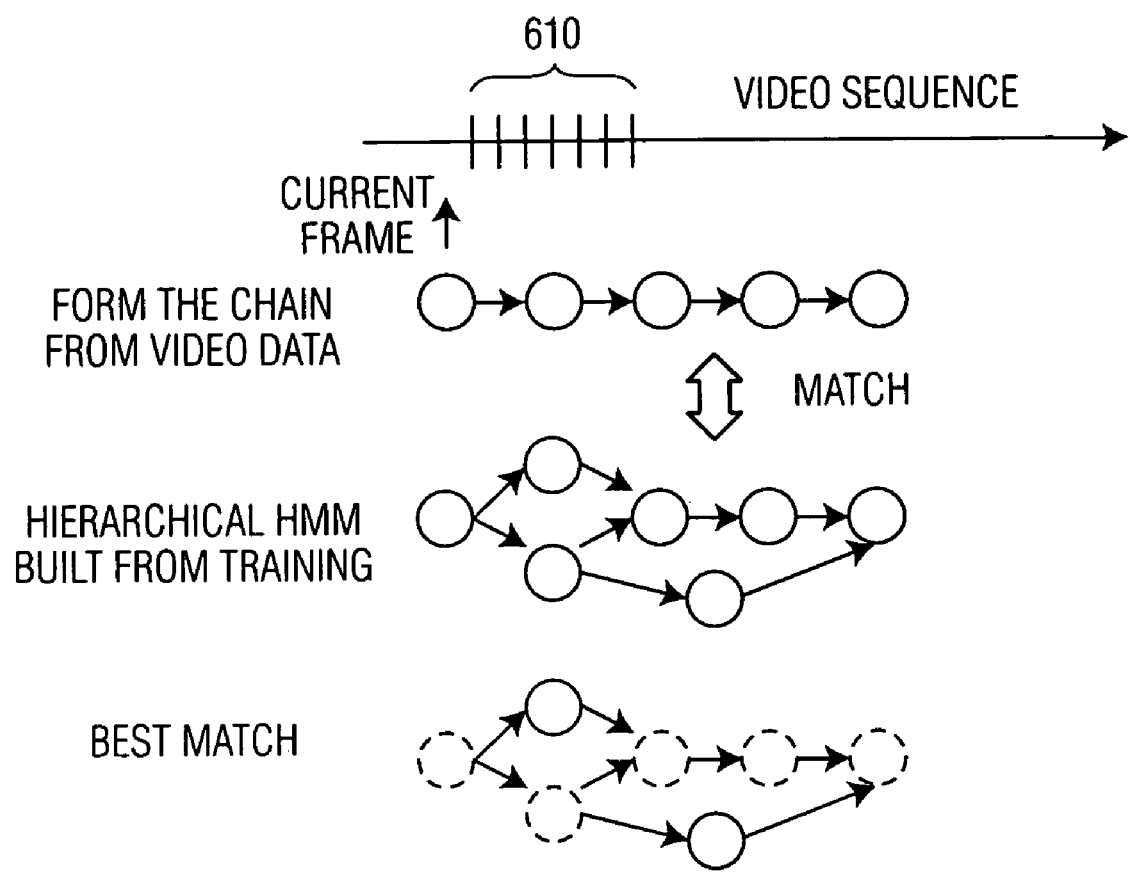
FIG. 6 illustrates the identification of a path in a hierarchical HMM having the best match with a video sequence.

FIG. 6 illustrates the identification of a path in a hierarchical HMM having the best match with a video sequence. As shown in FIG. 6, an image sequence 610 having a plurality of frames is processed by the hierarchical HMM classification process 500 (FIG. 5). The current frame in the image sequence 610 is aligned with the starting node in the hierarchical HMM, and is then compared with each path of the hierarchical HMM model. The path having the best match (indicated in FIG. 6 by the path comprised of nodes indicated with hashed lines) is then identified. If the score of the best path exceeds a predefined threshold, then the event associated with the path is detected.

Additional recognition accuracy can be obtained by exploiting information that may be known about the context of an event. In certain applications, such as elderly monitoring, where a subtle distinction between similar events is important (e.g., a person falling down to the floor versus lying down on a bed), context information, such as time or location information, can be used to improve event recognition accuracy. For example, if the hierarchical classification process 500 determines that a person is lying down, additional accuracy can be obtained by ensuring that the person is not in a bed, or that it is not bed-time, before the event is classified as a "falling down" event.

It is to be understood that the embodiments and variations shown and described herein are merely illustrative of the principles of this invention and that various modifications may be implemented by those skilled in the art without departing from the scope and spirit of the invention.

What is claimed is:

1. A method for representing an event in a computer vision system, comprising:
   processing a number of images of said event;
   initializing a hierarchical HMM with a start state and an end state;
   iteratively training said hierarchical HMM to add additional states between the start and end states until an overall likelihood criterion is satisfied; and
   generating said hierarchical HMM to represent said event, said hierarchical HMM including a plurality of paths each representing a variation of said event.

2. The method of claim 1, wherein said images include images of said event manifested in various ways.

3. The method of claim 1, wherein said images include images of said event observed from multiple viewpoints.

4. The meted of claim 1, wherein said generating further comprises splitting a state in said hierarchical HMM into two states if the state is not sufficiently representative to create a branch from the split state.

5. The method of claim 1, wherein said generating further comprises reducing overlapping states in said hierarchical HMM model.

6. The method of claim 1, wherein said variation of said event is a variation in terms of a speed of said event.

7. The method of claim 1, wherein said variation of said event is a variation in terms of a direction of said event.

8. The method of claim 1, wherein said variation of said event is a variation in terms of intermediate states of a body posture associated with said event.

9. The method of claim 1, further comprising comparing an image sequence to said hierarchical HMM to recognize said event.

10. A method for representing an event in a computer vision system, comprising:
comparing a sequence of input images to a hierarchical HMM representing said event, said hierarchical HMM initiliazed with a start state and an end state and iteratively trained to add additional states between the start and end states until an overall likelihood criterion is satisfied; and
detecting said event if said comparing step exceeds a predefined criteria.

11. The method of claim 10, wherein said detecting further comprises finding a path in said hierarchical HMM that matches said sequence of input images.

12. The method of claim 10, wherein said hierarchical HMM includes a plurality of paths each representing a variation of said event.

13. The method of claim 12, wherein said variation of said event is a variation in terms of a speed of said event.

14. The method of claim 12, wherein said variation of said event is a variation in terms of a direction of said event.

15. The method of claim 12, wherein said variation of said event is a variation in terms of intermediate states of a body posture associated with said event.

16. The method of claim 10, further comprising evaluating context information associated with said event.

17. A system for representing an event in a computer vision system, comprising:
a memory that stores computer-readable code; and
a processor operatively coupled to said memory, said processor configured to implement said computer-readable code, said computer-readable code configured to:
process a number of images of said event;
initialize a hierarchical HMM with a start state and an end state;
iteratively train said hierarchical HMM to add additional states between the start and end states until an overall likelihood criterion is satisfied; and
generate said hierarhical HMM to represent said event, said hierarchical HMM including a plurality of paths each representing a variation of said event.

18. The system of claim 17, wherein said processor is further configured to split a state in said hierarchical HMM into two states if the state model is not sufficiently representative to create a branch from the split state.

19. The system of claim 17, wherein said processor is further configured to reduce overlapping states in said hierarchical HMM model.

20. The system of claim 17, wherein said processor is further configured to compare an image sequence to said hierarchical HMM to recognize said event.

21. A system for representing an event in a computer vision system, comprising:
a memory that stores computer-readable code; and
a processor operatively coupled to said memory, said processor configured to implement said computer-readable code, said computer-readable code configured to:
compare a sequence of input images to a hierarchical HMM representing said event, said hierarchical HMM initialized with a start state and an end state and iteratively trained to add additional states between the start and end states until an overall likelihood criterion is satisfied; and
detect said event if said comparing exceeds a predefined criteria.

22. The system of claim 21, wherein said processor is further configured to find a path in said hierarchical HMM that matches said sequence of input images.

23. The system of claim 21, wherein said hierarchical HMM includes a plurality of paths each representing a variation of said event.

24. An article of manufacture for representing an event in a computer vision system, comprising:
a computer-readable medium having computer-readable code means embodied thereon, said computer-readable program code means comprising:
processing a number of images of said event;
initializing a hierarchical HMM with a start state and an end state;
iteratively training said hierarchical HMM to add additional states between the start and end states until an overall likelihood criterion is satisfied; and
generating a hierarhical HMM to represent said event, said hierarchical HMM including a plurality of paths each representing a variation of said event.

25. An article of manufacture for representing an event in a computer vision system, comprising:
a computer-readable medium having computer-readable code means embodied thereon, said computer-readable program code means comprising:
comparing a sequence of input images to a hierarchical HMM representing said event, said hierarchical HMM initialized with a start state and an end state and iteratively trained to add additional states between the start and end states until an overall likelihood criterion is satisfied; and
detecting said event if said comparing step exceeds a predefined criteria.

* * * * *